United States Patent [19]

Eryou et al.

[11] Patent Number: 5,648,714

[45] Date of Patent: Jul. 15, 1997

[54] METHOD AND DEVICE FOR CHARGING AND CONDITIONING BATTERIES

[75] Inventors: Douglas F. Eryou; Vladimir Federman, both of Winnipeg, Canada

[73] Assignee: 3266991 Manitoba Ltd., Winnipeg, Canada

[21] Appl. No.: 352,040

[22] Filed: Nov. 30, 1994

[51] Int. Cl.$^6$ .............................. H02J 7/16; H01M 10/44
[52] U.S. Cl. .................................... 320/27; 320/4
[58] Field of Search ...................... 320/4, 21, 50; 324/430, 432

[56] References Cited

U.S. PATENT DOCUMENTS

| | | |
|---|---|---|
| 3,553,561 | 1/1971 | Lesher . |
| 3,579,075 | 5/1971 | Floyd . |
| 3,586,955 | 6/1971 | Kisiel . |
| 3,629,681 | 12/1971 | Gurwicz . |
| 3,663,939 | 5/1972 | Olsson . |
| 3,816,807 | 6/1974 | Taylor . |
| 3,963,976 | 6/1976 | Clark ........................................ 320/21 |
| 4,016,473 | 4/1977 | Newman ................. 320/21 X |
| 4,183,080 | 1/1980 | Liebman . |
| 4,214,198 | 7/1980 | Schneider . |
| 4,237,409 | 12/1980 | Sugalski . |
| 4,246,634 | 1/1981 | Purol . |
| 4,302,714 | 11/1981 | Vefsky . |
| 4,320,333 | 3/1982 | Hase . |
| 4,355,275 | 10/1982 | Anglin . |
| 4,363,005 | 12/1982 | Kuroda et al. . |
| 4,366,430 | 12/1982 | Wright . |
| 4,371,827 | 2/1983 | Mullergman et al. . |
| 4,386,308 | 5/1983 | Emile, Jr. et al. . |
| 4,388,583 | 6/1983 | Krueger . |
| 4,388,584 | 6/1983 | Dahl et al. . |
| 4,389,608 | 6/1983 | Dahl et al. . |
| 4,396,881 | 8/1983 | Cook et al. . |
| 4,513,238 | 4/1985 | Orban . |
| 4,568,869 | 2/1986 | Graham, Jr. . |
| 4,584,514 | 4/1986 | Kaminski . |
| 4,609,860 | 9/1986 | Fasen . |
| 4,695,784 | 9/1987 | Reynolds . |
| 4,697,136 | 9/1987 | Ishikawa . |
| 4,750,102 | 6/1988 | Yamano et al. . |
| 4,843,299 | 6/1989 | Hutchings . |
| 4,871,959 | 10/1989 | Gali ................................ 320/61 |
| 4,882,663 | 11/1989 | Nilssen . |
| 4,947,124 | 8/1990 | Hauser . |
| 4,965,507 | 10/1990 | Smilanich et al. . |
| 5,049,804 | 9/1991 | Hutchins . |
| 5,063,341 | 11/1991 | Gali ................................ 320/21 |
| 5,084,664 | 1/1992 | Gail ................................ 320/61 |
| 5,172,044 | 12/1992 | Sasaki et al. . |
| 5,254,951 | 10/1993 | Goto et al. . |
| 5,274,321 | 12/1993 | Matsuda . |
| 5,276,393 | 1/1994 | Gali ................................ 320/21 |
| 5,289,102 | 2/1994 | Toya . |
| 5,290,643 | 3/1994 | Chen . |
| 5,291,118 | 3/1994 | Kojima . |
| 5,463,304 | 10/1995 | Winters ............................. 320/4 |
| 5,491,399 | 2/1996 | Gregory et al. . |
| 5,525,892 | 6/1996 | Phommarath ................. 320/21 X |

FOREIGN PATENT DOCUMENTS

| | | |
|---|---|---|
| 0 336 381 A2 | 4/1989 | European Pat. Off. . |
| 0 593 196 A2 | 6/1993 | European Pat. Off. . |
| WO 91/19343 | 12/1991 | WIPO . |

OTHER PUBLICATIONS

Hayt, William and Kemmerly, Jack; Engineering Circuit Analysis, Third Edition; pp. 206-214 1978.

*Primary Examiner*—Peter S. Wong
*Assistant Examiner*—Patrick B. Law
*Attorney, Agent, or Firm*—Smith & Catlett, PC

[57] ABSTRACT

A battery charging and conditioning circuit is provided wherein application of a charging current to a battery (B) is alternated with the application of short current spikes. The impedance characteristic and no load voltage characteristic of the battery are monitored and processed to select the charging current and spiked current applied to the battery. Processing of the impedance characteristic and no load voltage characteristic of the battery is made by a processing unit (5). The circuit used to generate the short current spikes responds to a timing signal produced by an oscillator (15) by opening and closing a switch (11) to release charge stored in a charge storage device such as an inductor (19), the released charge comprising a current pulse for application to the battery.

33 Claims, 4 Drawing Sheets

METHOD AND DEVICE FOR CHARGING AND CONDITIONING BATTERIES

This invention relates to devices for charging and/or conditioning batteries having one or more electrolytic cells and particularly but not exclusively to lead acid batteries. The invention may particularly but not exclusively be embodied in chargers which monitor the condition of the battery and tailor the characteristics of the charge they deliver to battery condition.

BACKGROUND OF THE INVENTION

During the discharge of a lead acid battery, $H_2SO_4$ is consumed and water is formed, resulting in a weakened electrolyte solution. The more deeply the battery is discharged, the lower the concentration of the $H_2SO_4$. During discharge, insoluble lead sulfate ($PbSO_4$) forms and adheres to both the cathode and anode in equal amounts, effectively shielding and passivating both electrodes. This "double sulfate" theory was first recorded in engineering literature over one hundred years ago. The molecular volume of the $PbSO_4$ is appreciably greater than that of either the $PbO_2$ or the Pb from which it is formed. The porosity of the active materials falls steadily during discharge. As discharge proceeds, the internal resistance of the cell rises due to $PbSO_4$ formation and the decrease in electrolyte conductivity as the $H_2SO_4$ is consumed. The reduced active material of the battery has a pronounced negative effect on the capacity of the battery.

The charging process reverses the direction of the discharging reaction. During an effective charging process, the $PbSO_4$ is converted to Pb at one electrode and to $PbO_2$ at the other, both in contact with the electrolyte of dilute sulfuric acid—thus restoring the materials of a fully charged cell.

However, rate of charging is important. If the concentration of $H_2SO_4$ is very low, as it is in a battery which is sulfated, the battery will overheat during the charging process causing damage to the battery. Water of the electrolyte may be decomposed into $H_2$ and $O_2$ which has the potential of causing an explosion. Furthermore, the production of these gases can dislodge Pb, $PbO_2$, or $PbSO_4$ from the plates. These solids accumulate as a sludge at the bottom of the battery. In time, they may cause a short circuit which will render the battery useless.

Charging should also be tailored to the type of battery being charged. Deep discharge batteries with thick plates have a lower charge acceptance than other batteries. The rate at which the battery absorbs charge depends upon the diffusion of the electrolyte throughout the active material on the plate. The thicker the plate, the slower the diffusion and the lower the charge acceptance.

Gali in his U.S. Pat. Nos. 4,871,959 issued Oct. 3, 1989, 5,063,341 issued 1991, 5,084,664 issued Jan. 28, 1992 and 5,276,393 issued Jan. 4, 1994 discloses a technique for conditioning a battery during charging in which the charge includes a plurality of spikes or pulses in the charging voltage. The patents of Gali are not clear as to the dimensions of the pulses including particularly the current and voltage at the peaks of the pulses but the particular technique used by Gali in the machine manufactured in practice involves the use of a transformer which can be used to increase the voltage in a voltage pulse but in view of the increased number of windings in the secondary, this increase in voltage is obtained while reducing the current available. In practice, therefore, the pulse generated in the machine proposed by Gali, which is manufactured and sold by Motor Products and Pulse Charge Systems in USA, generates pulses of a significant voltage value but provides a current which is limited by the transformer technique to a value of the order of a few milliamps. The most recent of the above patents explains the operation of the device in terms of a resonance effect in which the pulse generates an oscillating voltage alternately increasing and decreasing the charging voltage while gradually declining toward the end of the pulse. The phenomenon of the conditioning of the battery is therefore explained in terms of the resonance of the cells.

In practice the above machine has been found to provide some conditioning of the battery thus reducing the amount of sulfation but the effect obtained is relatively slow so that a valuable effect on the state of the sulfated battery is obtained only after many days or weeks of conditioning.

U.S. Pat. No. 4,843,299 (Hutchings) issued Jun. 27, 1989 discloses a battery charging which includes a microprocessor control for detecting the current, voltage and temperature of the battery for controlling the battery charging profile. However, this patent does not disclose any techniques for conditioning the battery to reduce the state of sulfation of heavily sulfated batteries.

U.S. Pat. No. 3,816,807 (Taylor) issued Jun. 11, 1974 discloses an impedance control battery charger including a monitoring system in the form of a feedback control for automatically adjusting the DC current supplied to the battery to match the current accepting capabilities of the battery. However again the patent discloses no techniques for conditioning the battery to reduce sulfation.

U.S. Pat. No. 5,172,044 (Sasaki) issued Dec. 15, 1992 discloses a battery charger which controls the charging current and the voltage on the assumption that the battery charging follows a predetermined charging curve. Over again the patent discloses no techniques for reducing sulfation.

SUMMARY OF THE INVENTION

It is one object of the present invention to provide an improved method for conditioning a battery which can reduce sulfation of the plates within a significantly reduced period of time. Accordingly there is provided a charging process which alternates periods of application of a charging current with the introduction of a series of short spikes of energy into the battery has been found to facilitate the conversion of crystallized $PbSO_4$ to Pb and $PbO_2$, thus restoring the active material of the battery and the concentration of the electrolyte without the formation of sludge at the bottom of the cells. This charging process is governed by a microprocessor which periodically checks the condition of the battery and customizes both the charging current, and the strength of the spikes of energy to the battery condition.

It is thus a principal object of this invention to provide a battery charger which is capable of restoring the electrochemical efficiency of discharged lead acid batteries, in a manner which promotes restoring each cell to a healthy condition with a minimum of charge over and above that required to replace the previous output.

Another object of this invention is to provide a charging process which alternates delivery of charging current and delivery of a series of short spikes of energy in a manner appropriate to the battery's ability to accept a charge which is governed both by the design of the battery and the condition of the battery.

A further object is to provide such a battery charger which can alter its charging characteristics according to the state of discharge and state of internal resistance of the battery which the charger senses at any given time.

Yet another object of this invention is to provide a battery charger which facilitates the restoration of the active materials in a lead acid battery which has become sulfated.

According to a first aspect of the invention there is provided a method for conditioning plates of a battery having at least one electrolytic cell, a positive connection terminal and a negative connection terminal connected across the at least one cell, the method comprising connecting a first connector to the positive terminal, connecting a second connector to the negative terminal such that a substantially constant voltage is applied across the first and second connectors, generating a series of current pulses and applying the pulses across the first and second connectors, the pulses having a peak voltage measured above the constant voltage of greater than 0.2 volts times the number of cells and the pulses causing a current flow of greater than 1.0 amps through the cells.

In the arrangement, the entire battery charging and energy spiking process is governed by the control circuit. The control circuit consists of a microprocessor unit which governs the periodic interrogation of battery condition and selection and performance of charging and energy spiking methods appropriate to current battery condition. The circuitry of the microprocessor is able to determine battery voltage and battery internal resistance, and select a pattern of an appropriate charging current, interspersed with the transmission of spikes of energy into the battery to accomplish the stated objectives of the invention.

Should the microprocessor sense a low voltage, high resistance condition (indicative of battery sulfation) it will charge the battery with pulses of low current, interspersed with quick, vigorous, spikes of energy, the strength of which will be matched to the battery condition. The spikes of energy will have the capability of overshooting battery voltage in the range of one through twenty volts overshot. Delivery of charging current and energy spikes will be alternated throughout the charging process.

Should the microprocessor sense a low voltage, low internal resistance condition (indicative of discharge without appreciable sulfation), the device will primarily charge the battery with blocks of the maximum acceptable current. A brief period of delivery of quick, gentle spikes of energy, the strength of which will be matched to battery condition will also be administered during the charging process.

All charging processes will administer a charge which the battery is capable of accepting. This responsive charging method will ensure that active gassing does not occur within the battery.

Many chargers switch from charging to float charge when the gas point voltage is reached. They do not adequately charge the battery, which has not recovered all of its capacity at this point. This charging process will conclude with the delivery of a constant voltage charge which will allow the battery to accept current at its own natural absorption rate which is a function of battery design and state of charge. This process will result in a fully charged battery.

This invention will also remove the passive layer which occurs in lithium batteries.

This invention prevents the overheating of batteries (and consequential damage) which occurs during the charging process. Conventional battery chargers use battery voltage as their "cue" and with a battery that is sulfated, the combined effects of the sulfation and a very inefficient stagnant double layer surrounding the plates, the charging process is very inefficient, resulting in the generation of heat. As the battery heats, then voltage collapses, causing the charger to provide more current, until eventually the battery electrolyte begins to boil. The electrolyte evaporates to a point where the battery no longer functions. This is especially relevant with the new "maintenance free" batteries, in which there is a vent to allow evaporating electrolyte to escape, but generally no method to access the cells to replenish electrolyte.

This invention reduces the stagnant layer and improves the efficiency of the double layer, which both surround the battery plates. This is the area in the battery where the ion exchange takes place.

Embodiment to the invention will now be described in conjunction with the accompanying drawing in which:

BRIEF DESCRIPTION OF THE DRAWINGS

Part of FIG. 1 is a schematic illustration of the circuit providing a battery charging and reconditioning system for attachment to a lead/acid battery.

In the drawings like characters of reference indicate corresponding parts in the different figures.

DETAILED DESCRIPTION

Figure 1:
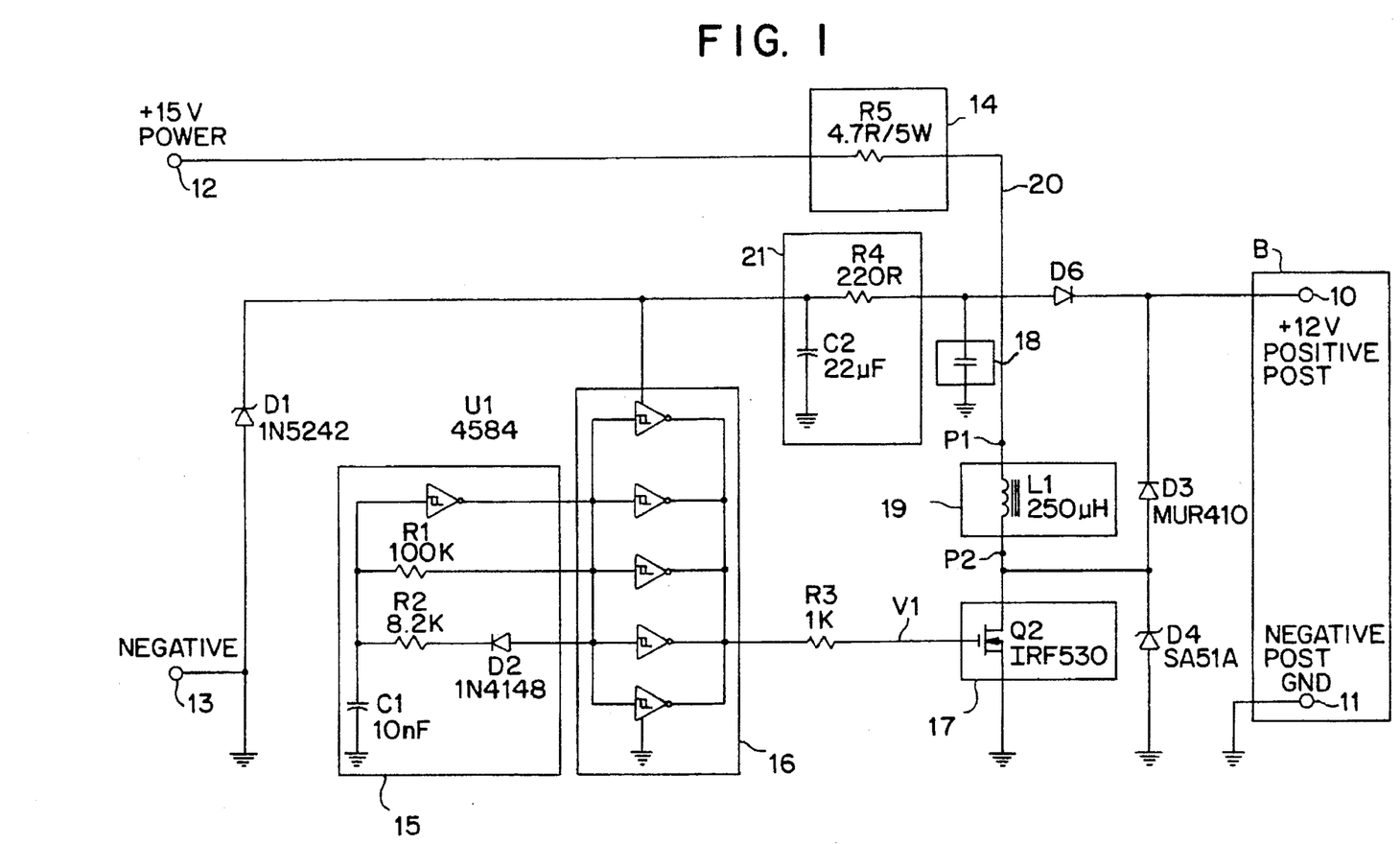

Turning firstly to FIG. 1 there is shown a circuit for charging and conditioning a battery, the positive and negative terminals of which are indicated at 10 and 11 respectively. The circuit can be connected to the terminal 10 and 11 in any suitable manner well known to one skilled in the art.

The circuit includes a power supply including a positive power terminal 12 and negative power terminal 13. The power supply can be provided by any suitable power source which will be well known to one skilled in the art including the use of solar power. The power supply in a separate circuit is rectified and filtered so as to provide a DC voltage across the terminals 12 and 13 of the order of 16 volts. The positive voltage is connected through a charge current control system 14 defined by resistor R5 and it is connected to the positive terminal through a diode D6. The charge current control system 14 thus limits the current supply and provides a trickle charge current for charging the battery in conventional manner.

Figure 2:
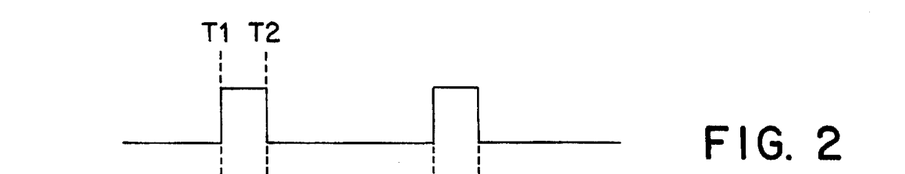
FIG. 2 is a graph of voltage against time showing the input voltage V1 to the switch.

In addition to the battery charging system, there is also included a conditioning pulse system for injecting current pulses on top of the DC current trickle charge voltage. The pulse generator circuit includes an oscillator 15 for generating a timing pulse at a predetermined frequency and of a predetermined pulse width. The pulse from the oscillator is supplied to a buffer circuit 16 which amplifies and shapes the pulse so that the output pulse from the oscillator and buffer is provided on the line at point V1. The output pulse is shown in FIG. 2 and is in the form of square wave having a leading edge at time T1 and trailing edge at time T2. A second pulse is also shown in FIG. 2 with the time space between the first and second pulse as being dependent upon the frequency generated by the oscillator 15.

The details of the oscillator and buffer are not described herein as these will be well apparent to one skilled in the art. The components of the oscillator 15 and the buffer 16 are shown in FIG. 1 and the person skilled in the art will be able to generate these devices with suitable component values by the application of normal skill.

The circuit further includes a switch 17 in the form of a transistor switch which is actuated to the closed and open conditions by the leading and trailing edges respectively of the pulse at V1. The circuit further comprises a current supply capacitor and a diode D3. The inductor coil 19 is connected in series with the switch 17 so as when the switch is closed current can flow from the power supply through the inductor coil 19 to ground. The current supply capacitor 18 is connected to the power supply line 20 so that sufficient charge is available to supply current to the inductor coil rather current being restricted by the charge current control resistor 14.

The point P2 on one side of the inductor coil is connected to the positive terminal 10 through the diode D3. The diode D3 prevents current from flowing through the line from the positive terminal back to the point P2 when the voltage at P2 drops below the voltage on the line 20 which is connected to the battery terminal.

A voltage filter 21 is provided which controls the voltage for the control circuits, further stabilized by diode D1, In operation, the oscillator 15 and buffer 16 generate the square wave pulse is shown in FIG. 2. Thus at the time T1 of the leading edge of the pulse, the transistor switch 17 is closed causing current to flow into the inductor coil 19, as shown in FIG. 2 in a constantly rising current pulse indicated at C2 with that increasing current indicator C2 increasing continually and gradually from time T1 up to time T2 at which time the current into the inductor coil 19 gradually declines from a maximum current C3 back to zero. The voltage at P2 is shown in FIG. 4. At the time T1 when the switch 17 is closed, the voltage drops immediately to zero shown at V0 from the line voltage VB. When the switch is opened at time T2, the voltage rapidly increases from V0 to the peak voltage VP. This increase in voltage occurs due to the supply of current from the inductor coil 19 which travels from the point at P2 through the diode D3 to the battery terminal. The current thus generated by the inductor due to the opening of the switch 17 and the inductance of the inductor coil 19 is supplied across the battery as a current pulse. The value of the current generated at point P2 by the inductor coil is equal to the current C3 which is that current passing through the inductor coil at a time T2 when the switch is opened.

The current pulse is thus applied to the battery terminal and passes through the battery so that the voltage across the battery dramatically increases to a voltage dependent upon the impedance across the battery. It will be noted that the only impedance between the point P2 and ground is the impedance across the battery.

Figure 3:
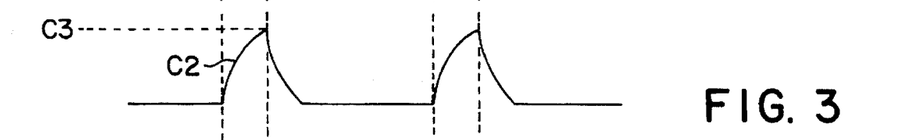
FIG. 3 is a graph of current in the inductor at the point of the second indicator P2.
Figure 4:
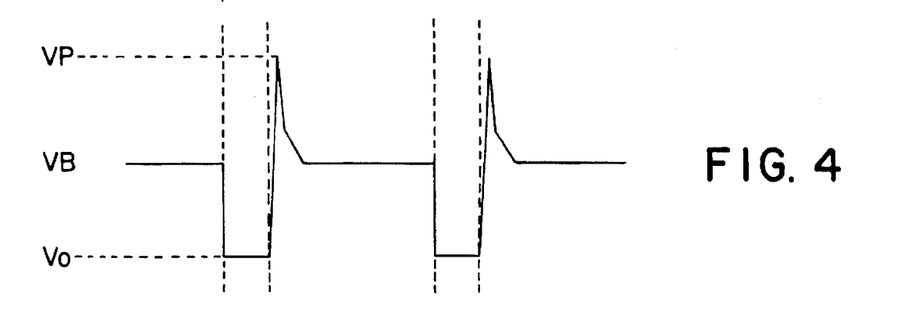
FIG. 4 is a graph of voltage against time at the point P2.
Figure 5:
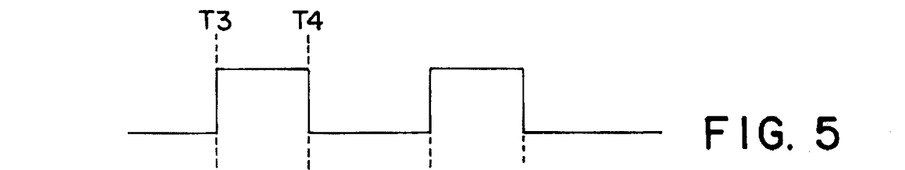
FIGS. 5, 6 and 7 corresponds to FIGS. 2, 3 and 4 showing the generation of an increased current pulse by increasing the time of opening of the switch.
Figure 6:
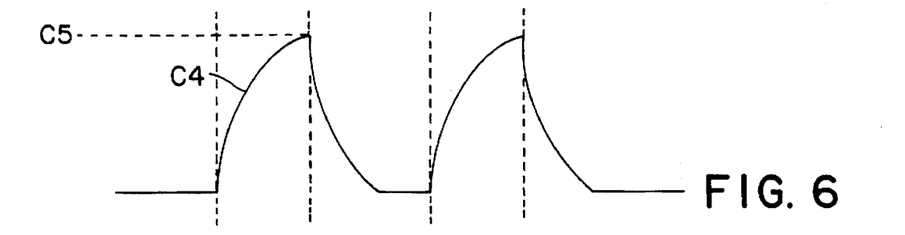
Figure 7:
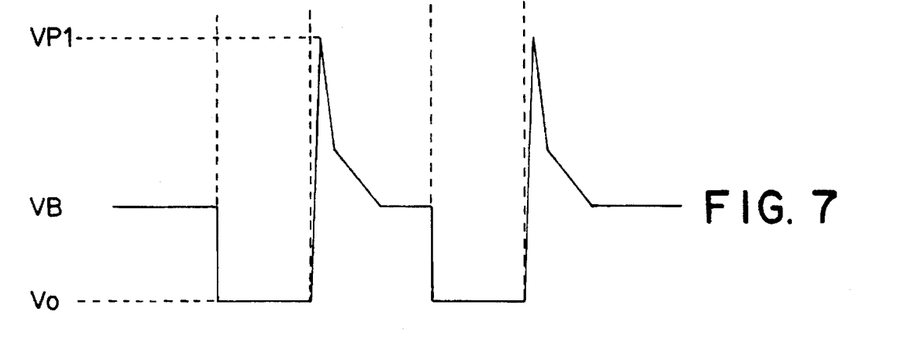

FIGS. 5, 6 and 7 show the same steps as FIGS. 2, 3 and 4 except that the oscillator 15 has been modified so that the time between the leading and trailing edges of pulse are shown at T3 and T4 is increased. This causes the current ramp C4 to rise for an increased period of time up to a maximum value C5 so that the peak voltage VP1 is increased relative to the peak voltage VP by an amount approximately proportional to the difference in width of the pulses. Thus if the pulse if doubled in length, the peak current C5 approximately is double the peak current C3 leading to a voltage pulse approximately twice VP assuming the battery impedance remains constant.

As shown in FIGS. 4 and 7, the current pulse falls rapidly from the peak back to the DC voltage across the battery terminals without causing the voltage to fall below the DC voltage across the terminals. This occurs because the current pulse is generated by a positive current applied as a peak on top of the DC current and therefore the pulse decays by a rapid reduction of the pulse current back to the DC current generated by the charging system. Observation of the shape of the pulse shows that the pulse includes an initial rapid decay followed by a slower decay.

When the transistor switch opens the inductor maintains the same current as just before the instant of opening. The current however has to find an alternative path. The voltage across the inductor is now determined by the impedance of the new path. This impedance has its resistive and inductive part. The resistive part is determined by the battery resistance and the resistance of the leads. The inductive part is determined by the inductance of the leads and by the finite response speed of the battery electrolyte. For these reasons the voltage initially rises to a relatively high value, than after some 50 nanoseconds the effects of lead inductance and that of the electrolyte finite response begin to vanish allowing the current to flow with less restriction, which manifest as decrease in the voltage. This way after the initial about 200 nanoseconds needed for the stabilization, the voltage is determined only by the resistance of the battery and decreases linearly the same way as the current of the inductor decrease.

In a typical arrangement, the overshot voltage is of the order of 1 volt for each 1 amp of pulse current. The total decay time from the rising edge of the pulse at T2 to the time T5 is of the order of 100 to 300 microseconds. The repetition time between T1 and T6 is of the order of 400 to 700 microseconds. The transient time from the initial rise of the pulse to the peak is of the order of 30 to 100 nanoseconds. The time from the initial rise to the end of the rapid decay at time T7 is of the order of 200 to 300 nanoseconds.

The current pulses in practice are selected so as to provide a current in the range 1 to 6 amps for a 12 volt battery system. A 12 volt battery has 6 cells. It is appreciated that the voltage is and current discussed in this application will be modified for battery systems having more or less cells to provide greater or smaller voltage output. In the 12 volt system, the application of a current pulse in the range 1 to 6 amps will generate a voltage across the terminals of between 5 and 80 volts depending upon the level of sulfation of the battery plates which therefore determines the particular impedance of the battery plates. Generally the pulse current is selected so as to maintain the voltage less than 80 volts so that in circumstances where the impedance is particularly high due to very high levels of sulfation, the smaller current pulse is required to be selected. In situations where the sulfation is less or has already been decreased by the action of the present device, the current pulse can be increased to the 6 amp level to maintain the voltage pulse across the terminals at a sufficient level preferably greater than 5 volts.

While the explanation for the operation of the pulses of the present device is not well determined, it is believed that the high energy pulses reduce the crystallization of the sulfates on the surface of the plates. This crystallization is reduced by the high energy pulse without the application to the battery of sufficient heat energy to cause decomposition of the electrolyte. In addition it is believed that there is a "memory" effect of the battery plates in that the application of the short period high energy pulse causes to some extent a continuing excitation of the ions in the electrolyte and the battery plates without the current flow and without the on going application of the heat energy so as to avoid the generation of breakdown gases and without boiling the electrolyte.

Figure 8:
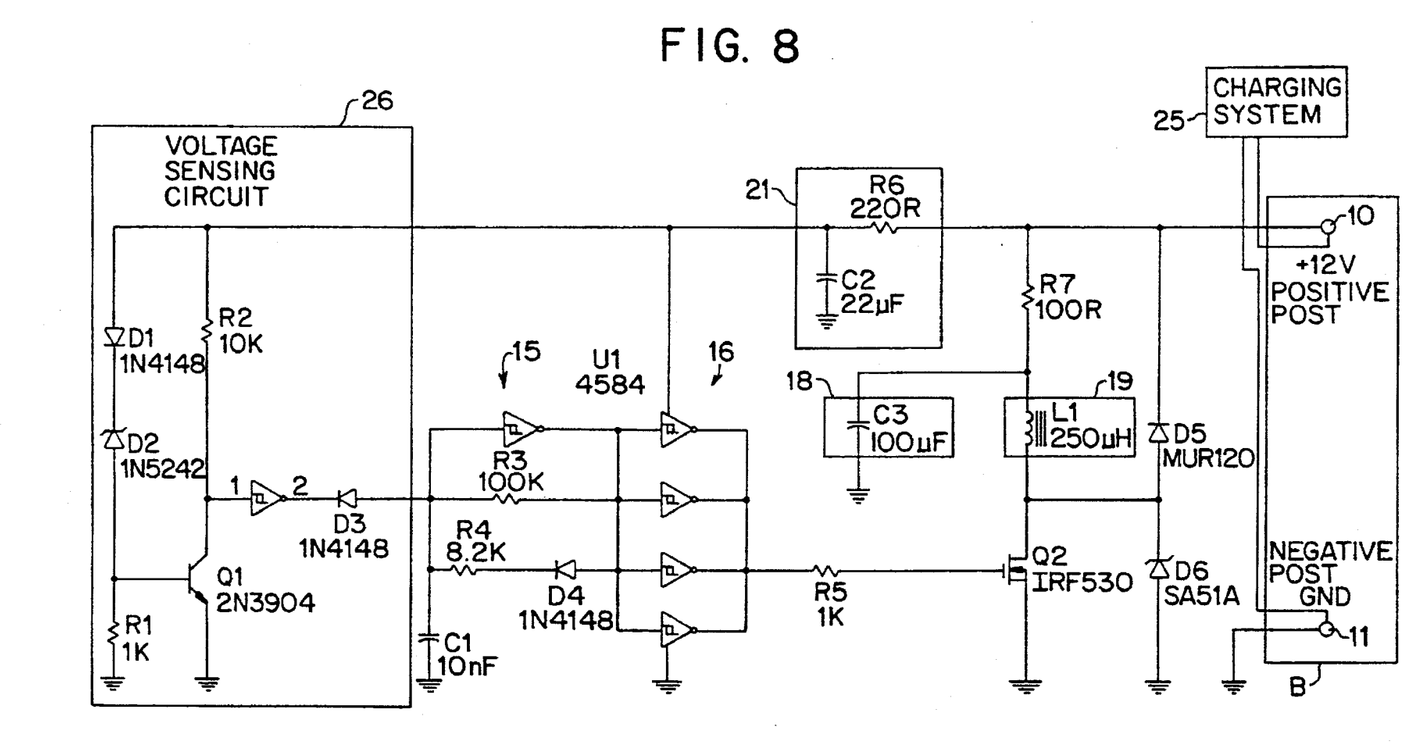
FIG. 8 is a circuit diagram similar to that of FIG. 1 showing a modified circuit for use in conditioning a battery in a separate battery power supply and charging system.

Turning now to FIG. 8 there is shown a modified circuit for use with a separate charging system 25 connected across the terminals 10 and 11 of the battery B. The conditioning circuit is therefore entirely separate from the charging system and its applied as an additional element simply attached across the battery terminals. The conditioning circuit therefore can be relatively small and self-contained. In the example therefore of a vehicle charging system, the conditioner can be attached as a separate element from the alternator and regulator systems of the charging system of the vehicle and separate from the battery. The separate element is therefore simply attached across the battery terminals and can be added as a retro fit to existing vehicles to provide ongoing conditioning of the battery.

The circuit of the device of FIG. 8 is therefore modified in that it does not require a separate power supply and simply takes power from the battery as required to generate the pulses in the inductor coil 19. In addition the circuit is modified by a voltage sensing circuit 26 which uses a zener diode D2 to close a transistor switch Q1 in response to the voltage across the diode exceeding the conventional battery voltage. Thus the sensing circuit 26 is responsive to the presence of excess voltage from the charging system 25 so that the pulsing circuit is only actuated when the charging system is in operation. When the voltage drops to the battery voltage, the transistor switch Q1 is opened which halts the input into the oscillator 15.

Figure 9:
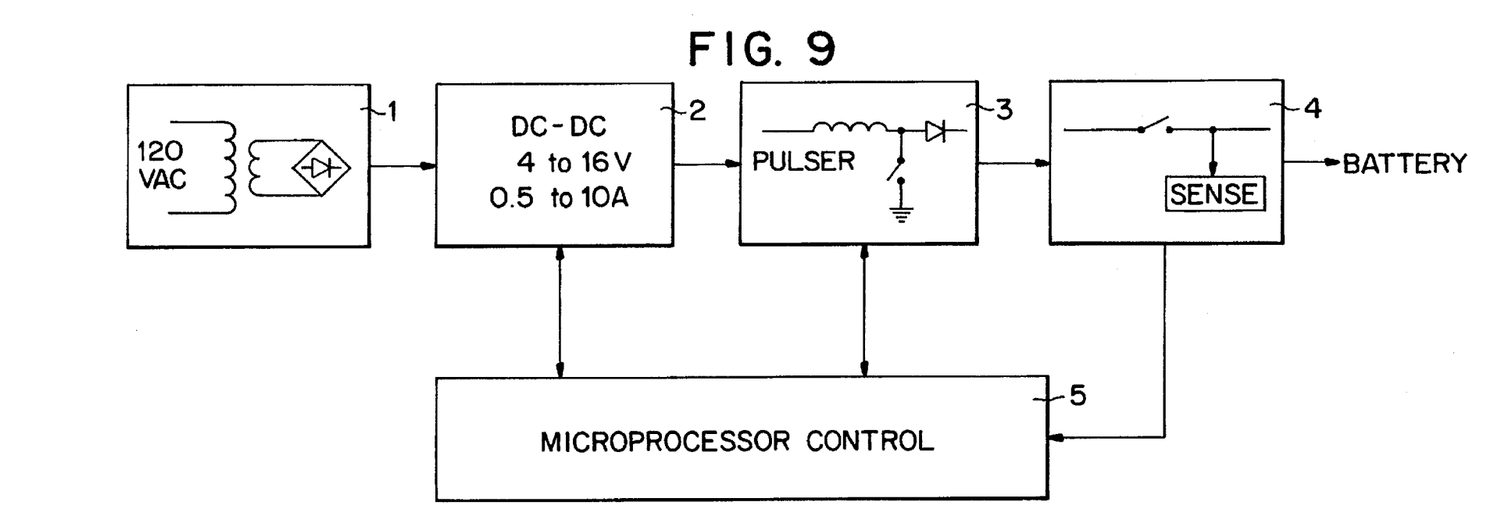
FIG. 9 is a block diagram showing a system somewhat similar to that of FIG. 1 in which is included microprocessor control for controlling the presence of and value of the charging current and the current pulses.

Turning now to FIG. 9 there is shown a modified arrangement illustrated in block diagram form which is an enhanced version of the arrangement shown in FIG. 1. In this enhanced version there is provided a power supply system 1, a DC voltage regulator system 2, a pulsing system 3 and a battery sensing system 4. An output from the battery sensing system 4 is supplied to a microprocessor control unit 5 which actuates control of the pulse generation system 3 and the DC voltage supply 2 in dependence upon the detection of the battery condition.

The power supply system 1 is of course of a conventional nature and will be well known to one skilled in the art. The voltage regulator system 2 again is of a conventional nature and can be controlled by the microprocessor to generate voltages in the range 4 to 16 volts and a current in the range 0.5 to 10 amps. The pulsing system 3 is arranged to generate current pulses in the manner described hereinbefore with the value of the current being variable, as discussed hereinbefore between 2 amps and 6 amps.

The battery sensing system is actuated by the microprocessor on a periodic basis which typically would be of the order of once every few minutes. The microprocessor thus actuates the DC voltage system 2 and the pulsing system 3 to halt actuation temporarily while the battery sensing system is actuated to detect the condition of the battery. This is effected by initially sensing the voltage across the battery under no load and subsequently a current of a predetermined value is applied across the battery to detect the impedance of the battery. Typically the current would be of the order of 1 amp which is applied from a constant current source across the battery terminals to detect the voltage increase across the battery and thus the impedance of the battery.

The microprocessor then carries a look up table to select the presence of and value of the charging voltage from the generator 2 and the presence of and value of the current pulse from the pulse generator 3 for application to the battery. One example of a look up table is set out as follows:

PROGRAM BRANCH DECISION TABLE
(based on no load battery voltage)

| BATTERY VOLTAGE | CHARGE CURRENT | BRANCH TO |
|---|---|---|
| 4 volt | 5 A | CHARGE |
| 5 volt | 5 A | CHARGE |
| 6 volt | 5 A | CHARGE |
| 7 volt | 6 A | CHARGE |
| 8 volt | 7 A | CHARGE |
| 9 volt | 8 A | CHARGE |
| 10 volt | 10 A | CHARGE |
| 11 volt | 10 A | CHARGE & PULSE |
| 12 volt | 10 A | CHARGE & PULSE |
| 13 volt | 6 A | CHARGE & PULSE |
| 14 volt | 1 A | FLOAT PULSE |
| 15 volt | .4 A | FLOAT PULSE |
| 16 volt | .2 A | FLOAT PULSE |

FIND PULSE CURRENT TABLE

| IMPEDANCE (relative unit) | PULSE CURRENT NO PULSE |
|---|---|
| 1 | 2 A |
| 2 | 2 A |
| 3 | 2 A |
| 4 | 3 A |
| 5 | 4 A |
| 6 | 4 A |
| 7 | 5 A |
| 8 | 6 A |
| 9 | 6 A |

In general, therefore, the enhanced device of FIG. 9 continually monitors the battery condition and provides either just a charge voltage or just a pulse or both depending upon the condition of the battery. In addition the value of the charge voltage and the value of the current pulse can be controlled in careful dependence upon the battery condition to provide the best effect for conditioning and charging the battery to fully charged condition.

Upon connecting to a battery the microprocessor determines the battery voltage and the battery impedance. Based on these conditions the program finds the optimal charging current, and the voltage limit. Once the battery voltage reaches this limit and if the battery impedance is high the microcontroller starts to pulse the battery. The higher the battery impedance is, the higher pulsing current is used. The values of all the variables, like battery voltage, charging current, pulsing current and battery impedance are stored in the look up tables in the program. Pulsing continues until the battery impedance drops to low level. Then if the battery is fully charged the control switches into a float mode. If the battery still needs additional charge the unit continues to charge. In the float mode the charging voltage is reduced to 13.8 volts so that there is in effect no carge current and a gentle pulse of about 1A is introduced. In a case where the impedence is very low, the float pulse can be halted. The impedence can be measured by increasing the current value in steps until a predetermined voltage is reached. The table of impedences set out above uses such a technique and the value listed are simply relative or arbitrary values dependent on the number of steps of a predetermined current values necessary to reach the voltage. It has been found that the pulse operation has the best efficiency for conditioning the battery when the battery is charged and hence the pulse operation is only started when the battery voltage reaches 11 volts. The float pulse provides only the low level or gentle pulse and this has been found to achieve the most efficient final conditioning of the battery while completing the charge up to maximum electrolyte conversion.

Figure 10:
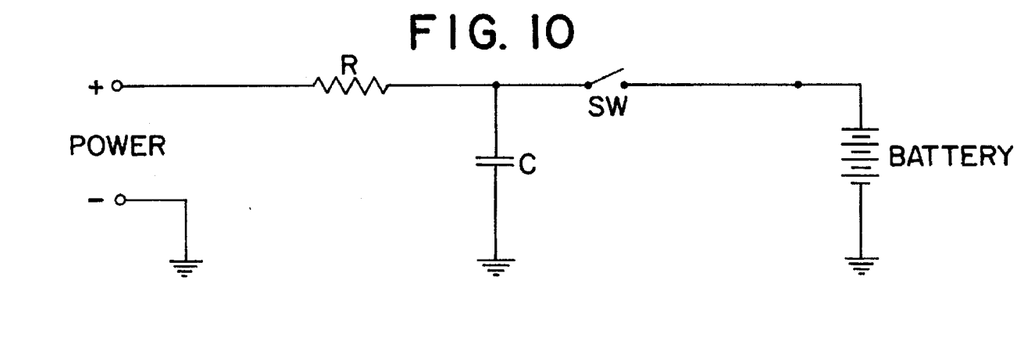
FIG. 10 is a schematic illustration of a circuit proposed as an alternative for the inductor coil system of FIG. 1 and instead utilizing pulses generated by a capacitor supply.

Turning now to FIG. 10 there is shown a modified circuit for generating pulses for injection into the battery. In this modified circuit, the pulses are generated in a capacitor C which is charged through a resistance R. A transistor switch SW operated by an oscillator as shown in FIG. 1 operates to repeatedly close the switch and release the charge from the capacitor into the battery as a voltage pulse.

In a normal state the switch SW is open and capacitor C is being charged through the current limiting resistor R from the voltage higher than the battery potential. Once the capacitor is charged, the switch SW closes allowing the capacitor to discharge into the battery. This way a fast voltage pulse is administered to the battery. The process repeats at a rate of about 8000 to 10,000 cycles per second.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A method for conditioning plates of a battery, the method comprising the steps of:
    connecting to a positive and negative terminal of the battery;
    applying a substantially constant voltage across the positive and negative terminals;
    generating a series of current pulses; and
    applying the pulses across the positive and negative terminals, the pulses having a peak voltage measured above the constant voltage and the pulses causing a current flow of greater than 1.0 amps through the battery and wherein the pulses have a time period from a leading edge to a trailing edge of less than 10 microseconds.

2. The method according to claim 1 wherein each pulse is arranged such that it is applied wholly above the constant voltage without substantially reducing the voltage across the terminals to a voltage less than the constant voltage.

3. The method according to claim 1 wherein the battery is a 12 volt battery and wherein each pulse causes a current flow at its peak in the range 2 to 6 amps.

4. The method according to claim 1 further including the step of controlling each pulse by generating a predetermined value of the current flow through the cells such that the voltage at the peak varies and is determined by the resistance of the battery across the positive and negative terminals.

5. The method according to claim 1 further including the steps of:
    detecting a voltage across the positive and negative terminals which is greater than the battery voltage; and
    generating the pulses only when the voltage detected is greater than the battery voltage.

6. The method according to claim 1 including using the voltage across the battery terminals to provide power for generating the pulses.

7. The method according to claim 1 further including the steps of
    periodically halting generation of the voltage pulses; and
    measuring, while the pulses are halted, a voltage generated by the battery and a resistance across the battery, the value of the charging voltage and the value of the pulses selected depending upon the measured battery voltage and battery resistance.

8. A method for conditioning plates of a battery having at least one electrolytic cell, a positive connection terminal and a negative connection terminal connected across the at least one cell, the method comprising connecting a first connector to the positive terminal, connecting a second connector to the negative terminal such that a substantially constant voltage is applied across the first and second connectors, generating a series of current pulses and applying the pulses across the first and second connectors, wherein the battery is provided as part of a battery power and charging system including a battery charging means connected across the positive and negative terminals of the battery and wherein the pulses are generated in a device separate from the charging means, the device receiving voltage from across the battery terminals for providing power for generating the pulses.

9. A method for conditioning plates of a battery having at least one electrolytic cell, a positive connection terminal and a negative connection terminal connected across the at least one cell, the method comprising connecting a first connector to the positive terminal, connecting a second connector to the negative terminal such that a substantially constant voltage is applied across the first and second connectors, generating a series of current pulses and applying the pulses across the first and second connectors, wherein the battery is provided as part of a battery power and charging system including a battery charging means connected across the positive and negative terminals of the battery including detecting a voltage across the positive and negative terminals which is greater that the battery voltage and generating the pulses only when the voltage is greater than the battery voltage.

10. A method for conditioning plates of a battery having at least one electrolytic cell, a positive connection terminal and a negative connection terminal connected across the at least one cell, the method comprising connecting a first connector to the positive terminal, connecting a second connector to the negative terminal such that a substantially constant voltage is applied across the first and second connectors, generating a series of current pulses and applying the pulses across the first and second connectors, periodically halting generation of the voltage pulses and measuring, while the pulses are halted, a voltage generated by the battery and a resistance across the battery and including providing means for generating a charging voltage and means for generating the voltage pulses and including selecting the presence of and value of the charging voltage and selecting the presence of and value of the pulses in dependence upon the battery voltage and battery resistance measured.

11. A method for conditioning plates of a battery having at least one electrolytic cell, a positive connection terminal and a negative connection terminal connected across the at least one cell, the method comprising connecting a first connector to the positive terminal, connecting a second connector to the negative terminal such that a substantially constant voltage is applied across the first and second connectors, providing an inductance coil, providing switch means for controlling passage of current through the inductance coil, initially closing the switch to cause a current to flow through the inductance coil and then opening the switch to cause the current in the inductance coil to flow to the positive terminal.

12. A device for charging and conditioning a battery, comprising:
   a first circuit for generating a variable trickle battery charging current;
   a second circuit for generating a variable pulsed battery conditioning current;
   means for connecting the first and second circuits to the battery;
   a sensor connected to the battery for sensing an impedance characteristic and a no load voltage characteristic of the battery, and for generating output signals indicative thereof; and
   a processing unit connected to the first and second circuits to control operation thereof, and connected to the sensor to receive the output impedance characteristic and voltage characteristic signals, the processing unit selecting, based on the sensed impedance characteristic and voltage characteristic of the battery, a value for the variable trickle battery charging current and a value for the variable pulsed battery conditioning current to be applied to the battery by the first and second circuits, respectively.

13. The device of claim 12 wherein the processing unit includes a look up table specifying operation of the first and second circuits in applying the variable trickle battery charging current and the variable pulsed battery conditioning current, respectively, either separately or in combination with each other based on the sensed impedance characteristic and voltage characteristic of the battery.

14. The device of claim 13 wherein the look up table specifies operation of the first circuit only in applying the variable trickle battery charging current for a first range of sensed no load voltage characteristic of the battery, specifies operation of the first and second circuits together in applying the variable trickle battery charging current and the variable pulsed battery conditioning current for a second range of sensed no load voltage characteristic of the battery greater than the first range, and specifies operation of the second circuit alone in applying the variable pulsed battery conditioning current for a third range of sensed no load voltage characteristic of the battery greater than the second range.

15. The device of claim 14 wherein the look up table further specifies the value of the variable trickle battery charging current to be applied to the battery based on the sensed no load voltage characteristic of the battery.

16. The device of claim 14 wherein the look up table further specifies the value for the variable pulsed battery conditioning current to be applied to the battery based on the sensed impedance characteristic of the battery.

17. The device of claim 16 wherein the value for the variable pulsed battery conditioning current to be applied to the battery generally increases the higher the sensed impedance characteristic of the battery.

18. The device of claim 12 wherein the processing unit further includes means for terminating operation of the first and second circuits during a time period used by the sensor in sensing the impedance characteristic and load voltage characteristic of the battery.

19. The device as in claim 12 wherein the second circuit for generating the variable pulsed battery conditioning current, comprises:
   a third circuit for generating a substantially square wave timing signal;
   a switch operable to close and open responsive to the timing signal;
   a charge storage device connected at a node in series with the switch between a power source and ground, the charge storage device storing charge from the power source when the switch is closed and generating a current pulse discharge from the charge storage device at the node when the switch is opened; and
   means for connecting the node to the battery for application of a train of the discharged current pulses to the battery.

20. The device as in claim 19 wherein the charge storage device comprises an inductor.

21. The device as in claim 19 wherein the third circuit comprises a square wave oscillator.

22. A device for conditioning a battery, comprising:
   a circuit for generating a variable pulsed battery conditioning current;
   means for connecting the circuit to the battery;
   a sensor connected to the battery for sensing an impedance characteristic and a no load voltage characteristic of the battery, and for generating output signals indicative thereof; and
   a processing unit connected to the circuit to control operation thereof, and connected to the sensor to receive the output impedance characteristic and voltage characteristic signals, the processing unit selecting, based on the sensed impedance characteristic and voltage characteristic of the battery, a value for the variable pulsed battery conditioning current to be applied to the battery by the circuit.

23. The device of claim 22 wherein the processing unit includes a look up table specifying operation of the circuit in applying the variable pulsed battery conditioning current based on the sensed impedance characteristic and voltage characteristic of the battery.

24. The device of claim 23 wherein the look up table specifies no operation of the circuit for a first range of sensed no load voltage characteristic of the battery, and specifies operation of the circuit in applying the variable pulsed battery conditioning current for a second range of sensed no load voltage characteristic of the battery greater than the first range.

25. The device of claim 23 wherein the look up table specifies the value for the variable pulsed battery conditioning current to be applied to the battery based on the sensed impedance characteristic of the battery.

26. The device of claim 25 wherein the value for the variable pulsed battery conditioning current to be applied to the battery generally increases the higher the sensed impedance characteristic of the battery.

27. The device of claim 22 wherein the processing unit further includes means for terminating operation of the circuit during a time period used by the sensor in sensing the impedance characteristic and no load voltage characteristic of the battery.

28. The device as in claim 22 wherein the circuit for generating the variable pulsed battery conditioning current, comprises:
   means of generating a substantially square wave timing signal;

a switch operable to close and open responsive to the timing signal;

a charge storage device connected at a node in series with the switch between a power source and ground, the charge storage device storing charge from the power source when the switch is closed and generating a current pulse discharge from the charge storage device at the node when the switch is opened; and means for connecting the node to the battery for application of a train of the discharged current pulses to the battery.

29. The device as in claim 28 wherein the charge storage device comprises an inductor.

30. The device as in claim 28 wherein the means for generating a substantially square wave timing signal comprises a square wave oscillator.

31. A device for charging and conditioning a battery, comprising:

a trickle charging circuit;

a square wave oscillator for generating a substantially square wave timing signal;

a switch operable to close and open responsive to the timing signal;

an inductor connected at a node in series with the switch between the battery and ground, the inductor storing charge from the battery when the switch is closed and generating a current pulse discharge from the inductor at the node when the switch is opened; and means for connecting the trickle charging circuit and the node to the battery for simultaneous application of a trickle charging current and a train of the discharged current pulses to the battery.

32. A device for conditioning a battery, comprising:

a square wave oscillator for generating a substantially square wave timing signal;

a switch operable to close and open responsive to the timing signal;

an inductor connected at a node in series with the switch between the battery and ground, the inductor storing charge from the battery when the switch is closed and generating a current pulse discharge from the battery at the node when the switch is opened; and means for connecting the node to the battery for application of a train of the discharged current pulses to the battery.

33. A device for conditioning a battery, comprising:

a circuit for generating a substantially square wave timing signal;

a switch operable to close and open responsive to the timing signal;

a charge storage device connected at a node in series with the switch between a power source and ground, the charge storage device storing charge from the power source when the switch is closed and generating a current pulse discharge from the charge storage device at the node when the switch is opened;

means for connecting the node to the battery for application of a train of the discharged current pulses to the battery; and a voltage sensing circuit connected to the battery for sensing the application of a trickle charging current to the battery, the voltage sensing circuit including means for activating the square wave circuit and causing the generation of the train of discharged current pulsed responsive to sensing the application of the trickle charging current to the battery.

* * * * *